Figure 1:
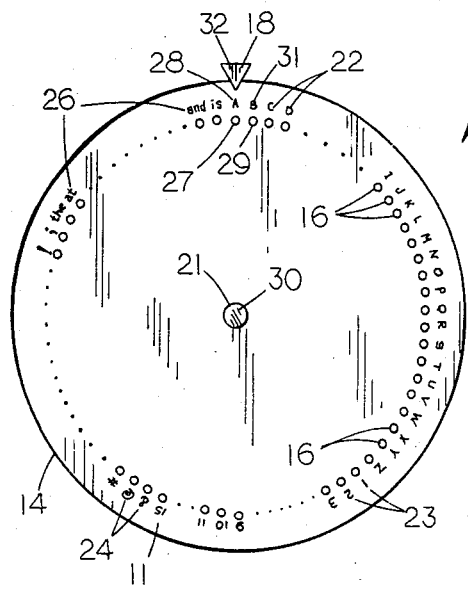

United States Patent [19]

Seals

[11] Patent Number: 4,590,469
[45] Date of Patent: May 20, 1986

[54] COLOR BASED DATA ENCODING AND STORAGE APPARATUS

[76] Inventor: James Seals, Rte. 1, Woodward, Iowa 50276

[21] Appl. No.: 644,413

[22] Filed: Aug. 27, 1984

[51] Int. Cl.⁴ .............................................. A03M 1/00
[52] U.S. Cl. ................................. 340/347 P; 250/271
[58] Field of Search .................... 250/271; 340/347 P

[56] References Cited

U.S. PATENT DOCUMENTS

| | | | |
|---|---|---|---|
| Re. 27,728 | 8/1973 | Kosker et al. | 340/347 P |
| 3,169,190 | 2/1965 | Ress | 250/209 |
| 3,412,255 | 11/1968 | Krieger | 250/227 |
| 3,663,813 | 5/1972 | Shaw | 250/271 |
| 3,744,039 | 7/1973 | Hrbek et al. | 340/173 LM |
| 3,771,150 | 11/1973 | Schneider | 340/173 CC |
| 3,774,169 | 11/1973 | Smith | 340/173 LT |
| 4,084,153 | 4/1978 | Otten | 365/125 |
| 4,090,031 | 5/1978 | Russell | 358/130 |
| 4,262,992 | 4/1981 | Berthold, III | 350/96.14 |
| 4,291,976 | 9/1981 | McMahon | 340/347 P |
| 4,348,074 | 9/1982 | Burns et al. | 350/96.11 |
| 4,350,999 | 9/1982 | Mortimer | 358/147 |
| 4,445,225 | 4/1984 | White | 250/271 |

OTHER PUBLICATIONS

IBM Tech. Disclosure Bulletin, "Sequential-Readout Identification Tag", vol. 17, No. 3, Aug. 1974, Dickerson et al.

*Primary Examiner*—Bernard Roskoski
*Attorney, Agent, or Firm*—Henderson & Sturm

[57] ABSTRACT

A color based data encoding and storage apparatus having an encoding unit (11), a storage unit (12) and a color encoded data transmission unit (13). The encoding unit (11) includes a plurality of colored lenses (16), each lens (16) being associated with a preselected discrete quantum of input data. The storage unit comprises a light shielded container (38) having a color encoded data placement unit (49) that can be moved in the X and Y axis over of color film (46). The color encoded data transmission unit (13) comprises an optical fiber that connects the encoding unit to the storage unit.

1 Claim, 7 Drawing Figures

COLOR BASED DATA ENCODING AND STORAGE APPARATUS

TECHNICAL FIELD

This invention relates generally to data encryption and storage apparatus.

BACKGROUND ART

At a very basic level, written words and their constituent individual letters represent an encoded form of verbal speech. Such familiar encryptions can been stored in various ways. For instance, alphabetic representations have been stored in printed text, handwritten text and in formatives derived from various three dimensional objects. Where space limitations exist, alphabetic encrypted data has also been stored in a size that requires magnification in order to be viewed, such as with microfilm and microfiche storage media.

In digital computer systems, data must be encrypted prior to use, because today's computers recognize only specialized code. Due to this need, a variety of data codes and encoding schemes and apparatus are known in the prior art to provide for the encryption of data and storage of encoded data.

Despite the existence of these systems, however, there does exist a need for encoding means of other sorts. In designing such means, storage density should be considered so that a reasonably large amount of data can be stored in a relatively small space. Further, the encryption process itself should be relatively speedy and accurate. If possible the storage media itself should be substantially non-volitile, to minimize the risk of losing data due to environmental factors.

DISCLOSURE OF INVENTION

These and other needs are substantially met through provision of the color based data encoding and storage apparatus disclosed in this specification. This apparatus includes generally an encoding unit, a storage unit and a color encoded data transmission unit.

The encoding unit includes generally a plurality of colored lenses disposed within a lens supporting member. A lens selection unit then serves to allow a particular colored lens to be chosen in conjunction with a particular discrete quantum of data input, as selected by use of a data input indicator. A light source unit provides light that passes through the lens, thereby associating that particular quantum of input data with the particular color of that lens, hence encoding the input data into a color based code. A great variety of colors and shades of colors can be utilized as desired to provide a small or large encryption base.

The storage unit provides an apparatus for storing the color encoded data. Unexposed color film can be utilized as the storage media. The storage unit itself serves to contain the film and provide for the controlled exposure of the film such that an orderly entry of color encoded data can be effectuated.

To serve this end, the storage unit has a light shielded container with a base that supports the unexposed or partially exposed color film. A color encoded data placement unit operably affixed to an X axis positioning unit and a Y axis positioning unit is supported above the color film such that it may be moved with respect thereto to allow for orderly entry of color encoded data onto the film.

The color encoded data transmission unit can be comprised of a single optical fiber. One end of this optical fiber should be placed to receive colored light input from the encoding unit. The remaining end of the optical fiber operably connects to the color encoded data placement unit of the storage unit such that colored light signals from the encoding unit can be transmitted directly to the color film, thereby exposing the color film on that particular area of the film's surface.

Various color recognition apparatus and devices already exist in the art that can differentiate between over two hundred colors and shades of colors. Decoding the stored color encoded data could therefore be effectuated in any number of ways. For instance, a light source could be placed behind the color film and an optical fiber positioned to receive the encoded data in a sequential manner. This data could then be transmitted to a color recognition system that reconverted the bits of color into the original data.

Given the slender optical fibers and high quality color films available today, rather high storage densities can be obtained with this system. For instance, it should be quite possible to store up to one thousand dots of color information per inch. In a one inch by one inch section of color film, this would yield a storage density of one million bits of information. Further, the use of color film as a storage media would avoid many of the problems of volitility normally associated with many other data storage media currently utilized for encoded materials.

BRIEF DESCRIPTION OF THE DRWAINGS

Figure 2:
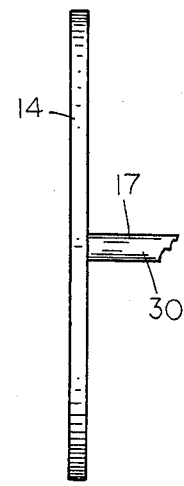
Figure 3:
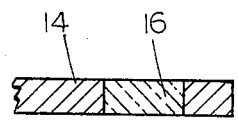
Figure 4:
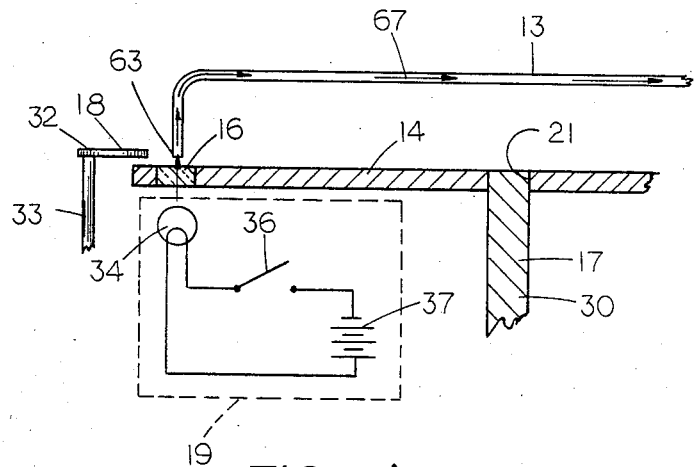
Figure 5:
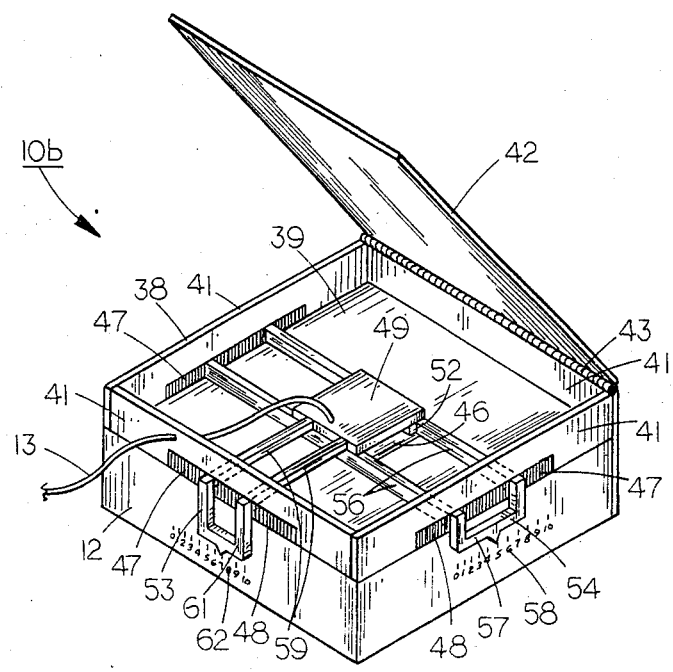
Figure 6:
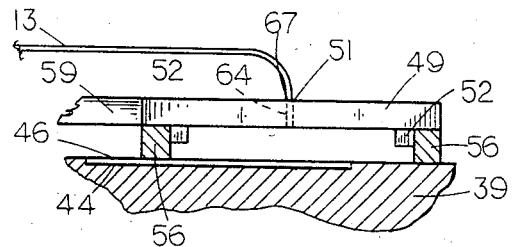
Figure 7:
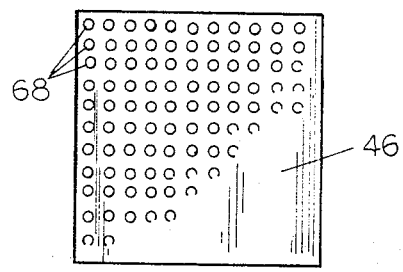

These and other attributes of the invention will become more clear upon a thorough review and study of the following description of the best mode for carrying out the invention, particularly when reviewed in conjunction with the drawings, wherein:

FIG. 1 comprises a top plan view of the encoding unit;

FIG. 2 comprises a side elevational view of the encoding unit;

FIG. 3 comprises an enlarged, sectioned side elevational view of a portion of the encoding unit;

FIG. 4 comprises a sectional side elevational view of a portion of the encoding unit and a part of the color encoded data transmission unit;

FIG. 5 comprises a perspective view of the storage unit;

FIG. 6 comprises an enlarged, partially sectioned view of a portion of the storage unit and a portion of the color encoded data transmission unit; and FIG. 7 comprises a top plan diagrammatic depiction of the storage media.

BEST MODE FOR CARRYING OUT THE INVENTION

Referring now to the drawings, and in particular to FIGS. 1 and 5, the apparatus can be seen generally as depicted by the numerals 10a and 10b. More particularly, the apparatus (10a and 10b) includes generally an encoding unit (11), a storage unit (12) and a color encoded data transmission unit (13). Each of these units will now be described in more detail in seriatim fashion.

The encoding unit (11) includes generally a lens supporting member (14), a plurality of colored lenses (16), a lens selection unit (17), a data input indicator (18) and a light source unit (19).

The lens supporting member (14) may be comprised in this embodiment of a disk having a hole (21) disposed through its center for receiving the lens selection unit shaft (30) disclosed below.

The plurality of colored lenses (16) are each formed of a circular shaped lens of substantially transparent material. Each lens represents a discrete color or shade of color. As shown in FIG. 3, both exterior surfaces of the lens (16) are planar. Other configurations could be utilized to provide optical characteristics as desired. The lenses (16) are radially disposed at identical distances from the center of the lens supporting member disk (14).

An alphabetic character (22), a number (23), a symbol (24) or other quantum of discrete data such as individual words (26) may be disposed on the surface of the lens supporting member (14) in juxtaposition to a lens (16) that is to be associated with that quantum of data. Simply stated, a red colored lens (27) could be associated with the letter "A" (28); a green colored lens (29) could be associated with the letter "B" (31), and so forth.

The lens selection unit (17), (FIG. 2) may be comprised of a shaft (30) disposed through the hole (21) provided for it in the lens supporting member (14). This shaft (30) can then be set in a journalled member (not shown) such that the lens supporting member (14) can rotate about its axis.

Referring to FIGS. 1 and 4, the data input indicator (18) may be a pointer (32) disposed somewhat above the lens supporting member (14) by a support beam (33) (FIG. 4). The pointer (32) allows an operator to input data for encryption and storage as described in more detail below.

The light source unit (19) (FIG. 4) includes a light source (34) such as light bulb, a switch (36) and a power source (37) such as a battery. By closing the switch (36), the light bulb (34) may be caused to illuminate.

Referring now to FIGS. 5 and 6, the storage unit (12) includes generally a light shielded container (38), a color encoded data placement unit (49), an X axis positioning unit (53) and a Y axis positioning unit (54).

The light shielded container (38) has a base (39), four sidewalls (41) and cover (42). In this particular embodiment, the cover (42) connects by a hinge (43) to a sidewall (41). With reference to FIG. 6, the base (39) has an indentation (44) formed therein for receiving color film (46). Referring back to FIG. 5, three of the sidewalls (41) have slots (47) formed therethrough for purposes described below. In order to preserve the light shielded nature of the container (38), these slots (47) may be protected by use of close fitting fabric (48) or other appropriate materials.

The color encoded data placement unit (49) comprises a rectangular shaped plate having a small opening (51) formed therethrough for receiving the color encoded data transmission unit (13) described further below. The color encoded data placement unit (49) also has a pair of guides (52) disposed on its underside in a substantially parallel configuration. The purpose of these guides (52) will also be made more clear below.

The Y axis positioning unit (54) has two parallel disposed tracks (56) that extend across the base (39) of the light shielded container (38). The tracks (56) extend through the slots (47) provided therefor in the sidewalls (41) of the light shielded container (38). A position indicator (57) connects to these tracks (56) such that the relative position of the Y axis positioning unit (54) with respect to the film (46) can be determined by comparing the position indicator (57) with a calibrated position scale (58) disposed on the light shielded container (38).

The X axis positioning unit (53) has two parallel disposed arms (59) that are secured to the color encoded data placement unit (49) at one end and that extend through a slot (47) provided therefor in a sidewall (41) of the light shielded container (38). A position indicator (61) connects to these extended arms (59). As with the Y axis positioning unit (54), the position of the X axis positioning unit (53) with respect to the film (46) can be determined by comparing the position indicator (61) with a calibrated position scale (62) disposed on the exterior of the light shielded container (38).

So configured, the X axis positioning unit (53) allows the color encoded data placement unit (49) to be moved in the X axis direction with respect to the film (46) by moving the color encoded data placement unit (49) along the tracks (56) of the Y axis positioning unit. The guides (52) aid in assuring correct movement of the color encoded data placement unit (49) along these tracks (56). Similarly, the position of the color encoded data placement unit (49) can be moved in the Y axis with respect to the film (46) by movement of the Y axis positioning unit (54).

Referring to FIGS. 4 and 6, the color encoded data transmission unit (13) will now be described. The transmission unit can be comprised of a single optical fiber. Such fibers are well known in the art and their properties well understood. Light may be introduced into one end of such a fiber and transmitted out the opposing end. The fiber may be bent and twisted in a variety of ways without obstructing movement of the light through the fiber. Such fibers can be as slender as 0.00254 cm. (0.001 in.).

A first end of the optical fiber (63) is disposed proximal to the light source (34) of the encoding unit (11). So positioned, light emitted from the light source (34) will pass through a colored lens (16) and then be received within the first end (63) of the optical fiber.

Referring to FIG. 6, the opening end of the optical fiber may be fit within the aperture (51) provided therefor in the color encoded data placement unit (49).

Use of the apparatus will now be described.

Referring to FIG. 1, the lens support member (14) of the encoding unit (11) may be rotated about the lens selection unit shaft (17) until the data input indicator (18) indicates selection of the desired quantum of data input (in FIG. 1, the alphabetic character "A" has been so selected). It should be noted that selection of a particular quantum of input data provides for automatic selection of a previously designated lens and the color associated therewith, in this case the lens depicted by the numeral 27.

Referring to FIG. 4, once the appropriate lens has been positioned, the light source unit (19) can be manipulated through closure of the switch (36) to cause the light source (34) to issue a beam of light through the lens (16) and into the first end (63) of the optical fiber of the color encoded data transmission unit (13). Movement of this colored light through the optical fiber has been depicted by arrows that are designated by the numeral 67.

Referring to FIG. 6, the colored light (67) continues through the optical fiber until it exits from the second end (64) thereof and exposes a small portion of the color film (46). Through proper and controlled positioning of the second end (64) of the optical fiber through control and placement of the color encoded data placement unit

(49) by use of the X axis and Y axis positioning units (53 and 54), exposure of the film may be controlled to provide an orderly matrix of colored dots that represent the color encoded data.

Referring to FIG. 7, one possible format for placement of such dots (68) can be seen. This process may be continued until the data density for this particular piece of film (46) has been equalled. The film (46) may then be removed and developed to yield a substantially non-volitile storage media for the color encoded data.

Obviously, many changes can be made with respect to the above described invention without expanding upon the basic inventive concepts set forth. For instance, variously configured lens support members could be provided depending upon the particular application involved. Further, a plurality of encoding units could be utilized with a single storage unit (12) to provide for parallel encoding of information. X axis and Y axis positioning of data on the film (46) could be made as dense as practical by providing finer increments of discrete movement. Beyond this, movement of the X and Y axis positioning units (53 and 54) could be automated and controlled by a microprocessor or the like to assure speedy and accurate positioning of the data on the film (46). Such modifications are not to be considered as outside the scope of the claims except as may be expressly provided therein.

I claim:

1. A color based data encoding and storage apparatus comprising:
    (a) encoding means for receiving data and converting said data to color encoded data, including:
        (i) a plurality of colored lenses, such that a discrete color and lens is provided for each discrete quantum of input data;
        (ii) a lens supporting member for supporting said plurality of colored lenses;
        (iii) lens selection means for allowing a preselected colored lens to be selected upon input of a desired quantum of input data; and
        (iv) light source means for selectively passing a beam of light through said selected colored lens;
    (b) storage means for receiving and storing said color encoded data, including;
        (i) a light shielded container for receiving color film;
        (ii) a color encoded data placement unit for movable disposition above said color film;
        (iii) X axis positioning means for allowing the position of said color encoded data placement unit to be moved in said X axis with respect to said color film; and
        (iv) Y axis positioning means for allowing the position of said color encoded data placement unit to be moved in said Y axis with respect to said color film; and
    (c) color encoded data transmission means for transmitting color encoded data from said encoding means to said storage means, comprising at least one optical fiber having a first end positioned to receive color coded data from said encoding means and a second end operably connected to said color encoded data placement unit for allowing said color film to be selectively exposed to said color encoded data.

* * * * *